United States Patent [19]

Dwyer et al.

[11] Patent Number: 4,858,213
[45] Date of Patent: Aug. 15, 1989

[54] DISPLAY FOR MODULAR DICTATION/TRANSCRIPTION SYSTEM

[75] Inventors: John J. Dwyer, Stratford; Emil F. Jachmann, Greenwich, both of Conn.; Mark N. Harris, Bronx, N.Y.; Brian F. Beloin, Milford, Conn.

[73] Assignee: Dictaphone Corporation, Stratford, Conn.

[21] Appl. No.: 895,011

[22] Filed: Aug. 8, 1986

[51] Int. Cl.[4] ............... H04M 11/10; G11B 27/34
[52] U.S. Cl. ............................. 369/28; 369/25
[58] Field of Search .............. 340/793, 753, 754, 706, 340/752; 369/25, 27–29; 379/75; 360/69, 71, 72.1, 72.2, 72.3, 74.4, 137

[56]  References Cited

U.S. PATENT DOCUMENTS

| Re. 32,342 | 1/1987 | Wilder et al. ........................ 369/28 |
|---|---|---|
| 3,585,629 | 6/1971 | Baynard, Jr. ...................... 340/793 |
| 4,092,680 | 5/1978 | Sander .............................. 360/72.3 |
| 4,130,849 | 12/1978 | Freehauf ............................ 360/137 |
| 4,172,231 | 10/1979 | d'Alayer de Costemore d'Arc et al. ................................. 360/72.3 |
| 4,200,893 | 4/1980 | Matison ............................. 369/28 |
| 4,221,938 | 9/1980 | Mohammadioun et al. . |
| 4,224,644 | 9/1980 | Lewis et al. ....................... 360/72.2 |
| 4,233,686 | 11/1980 | Sato ................................... 369/11 |
| 4,237,540 | 12/1980 | Sato ............................ 360/137 X |
| 4,263,481 | 4/1981 | Ho et al. . |
| 4,319,290 | 3/1982 | Bolick, Jr. et al. ................ 360/137 |
| 4,352,173 | 8/1982 | Titus, IV et al. .................. 369/27 |
| 4,369,478 | 1/1983 | Sato et al. ......................... 369/11 |
| 4,377,825 | 3/1983 | Kasubuchi et al. ................ 360/48 |
| 4,399,527 | 8/1983 | Titus, IV et al. .................. 369/28 |
| 4,410,923 | 10/1983 | Patal ................................. 360/137 |
| 4,470,135 | 9/1984 | Osanai ............................... 369/11 |
| 4,577,252 | 3/1986 | Kobayashi ........................ 360/137 |
| 4,623,988 | 11/1986 | Paulson et al. ................... 369/29 |
| 4,627,001 | 12/1986 | Stapleford et al. ........... 369/29 X |
| 4,663,678 | 5/1987 | Blum ............................... 360/72.2 |
| 4,677,501 | 6/1987 | Saltzman et al. ........... 360/137 X |

FOREIGN PATENT DOCUMENTS

| 55-48890 | 4/1980 | Japan .............................. 360/137 |
|---|---|---|
| 55-52573 | 4/1980 | Japan ................................ 360/69 |
| 55-77067 | 6/1980 | Japan ............................ 360/72.2 |
| 57-109102 | 7/1982 | Japan ................................ 360/69 |
| 58-114316 | 7/1983 | Japan ................................ 360/69 |
| 60-1670 | 1/1985 | Japan ............................ 360/72.2 |
| 60-253043 | 12/1985 | Japan ............................ 360/72.2 |
| 61-187185 | 8/1986 | Japan .............................. 360/137 |

Primary Examiner—Robert L. Richardson
Assistant Examiner—James E. Tomassini
Attorney, Agent, or Firm—Robert H. Whisker; Melvin J. Scolnick; David E. Pitchenik

[57]  ABSTRACT

A display for providing visual indications of the lengths of recorded messages, the positions of recorded instructions and the present relative location of a record medium. Three separate arrays are provided for these indications, respectively. Each recorded message may be a letter, note, memo, etc., and is indicated by steady-state energization of segments included in a first (letter) array. "Priority" messages are represented by a distinctive indication, such as by flashing the appropriate segments in that array. Similarly, "normal" and "special" instructions are represented by two different, distinctive indications, such as steady-state and flashing energization of particular segments in a second (instruction) array.

25 Claims, 5 Drawing Sheets

| CUE TYPE | CUE DATA COUNT |
|---|---|

FIG. 8

DISPLAY FOR MODULAR DICTATION/TRANSCRIPTION SYSTEM

BACKGROUND OF THE INVENTION

This invention relates to a display for dictation/transcription apparatus and, more particularly, to such a display for providing, concurrently, indications of lengths and locations of messages, locations of instructions, and the present relative location of the record medium upon which such messages and instructions are stored.

It is common, when operating dictation equipment, for a user to record several different, distinct messages on a single record medium, such as a magnetic tape. Advantageously, the end of one message and the beginning of the next-following message should be indicated, preferably by a visual display, to obviate the need for the user to review all of his dictation in order to access a desired message. Such a visual display is even more helpful to a transcriptionist to whom the task of transcribing the dictated messages is assigned. Modern dictating equipment, such as dictation devices sold by Dictaphone Corporation, the assignee of the present invention, is provided with visual display devices to provide such indications. Examples of such displays are disclosed in, for example, U.S. Pat. Nos. 4,051,540, 4,200,893 and 4,410,923, all assigned to the assignee of the present invention, the disclosures of which are incorporated herein by reference. A still further display is disclosed in copending application Ser. No. 564,480, filed Dec. 21, 1983 and also assigned to the assignee of this invention. The disclosure of this copending application likewise is incorporated herein by reference.

The aforementioned displays include an index formed of an array (typically, a linear array) of light indicator elements, or segments, constructed of LEDs, LCDs or other suitable indicator elements. Selected ones of these indicator elements are energized to provide visual indications of the locations of ends of letters, recorded instructions, and the like. Typically, after a user has completed the dictation of a message, such as a letter, he actuates a switch (known, generally, as a "letter" switch) which triggers a suitable generator to generate a "cue" signal that is recorded on the magnetic medium at the very location at which his message ends and which energizes a selected indicator element. Similarly, before dictating an instruction, special note or other distinguishable matter, the user may actuate an "instruction" switch to trigger the cue signal generator to generate an "instruction" cue signal that is recorded at the very location at which the instruction begins and to energize an appropriate selector element.

In some models of dictating equipment, the aforementioned "letter" and "instruction" switches are formed as two separate switching devices, or pushbuttons, each resulting in the recording of a different type of cue signal. In other models, the very same switch, or pushbutton, is used to record both the "letter" and the "instruction" cue signals. In these, a single "burst" of cue tone signal is recorded in response to the single actuation of the cue switch to designate a "letter" cue indication; and a double "burst" of cue tone signal is recorded by a double actuation of that cue switch to designate an "instruction" cue indication.

In dictation equipment of the aforementioned type, pulses are generated as the record medium (typically, magnetic tape) is transported. For example, a pulse generator may be coupled to the record medium transport system to generate those pulses. These pulses are counted; and the instantaneous count represents the present relative location of that medium and also serves to identify a particular indicator element included in the array which will be energized if a cue signal is generated. Thus, "letter" and "instruction" indications are provided, depending upon the count which has been reached and whether a "letter" or "instruction" cue signal is generated.

This "letter" and "instruction" indicator display is useful not only to the author of dictation but also to the transcriptionist. Typically, and as described in the aforementioned patents, the record medium upon which cue signals have been recorded is scanned prior to transcription. The recorded cue signals are detected and used to energize a similar array of indicator elements to provide a visual indication of the locations of recorded "letters" and "instructions". As the record medium is scanned, pulses are generated and counted; respective counts serving to identify the proper indicator element for energization if a cue signal is detected.

In addition to displaying the locations of "letters" and "instructions", the array used in dictating and transcribing equipment of the aforementioned type also provide cursor indications representing the present position of the record medium. In accordance with generally accepted protocols, individual indicator elements in the array are energized, one-at-a-time, in a left-to-right direction when the record medium is advanced, and in a right-to-left direction when the record medium is reversed. The particular indicator element to be energized is determined by the aforementioned count of pulses which are generated as the record medium moves.

In earlier versions of such dictation displays, a single array of indicator elements was used to provide "letter", "instruction" and cursor indications. Although an attempt was made to provide a distinction between "letter" and "instruction" indications, the resultant display often was confusing and it was difficult for the user to distinguish between the various types of information that were indicated. U.S. Pat. No. 4,410,923 suggests a solution to this problem and discloses two separate linear arrays: one to display the locations of "letters" and the other to display the locations of "instructions". One or the other of these arrays serves the additional purpose of providing a cursor indication and, typically, the cursor display is superimposed onto the "letter" display. As an example, a particular indicator element in the "letter" array is energized at a steady-state to indicate the location of a "letter", and is flashed to indicate the cursor location. One drawback of such a display is the inability to distinguish between different types of "letters" and different types of "instructions", and as a result, the display of different types of messages is constrained. For example, no distinction is provided between a "normal" letter and a "priority" letter, the latter requiring immediate attention and necessitating its transcription out of turn. Similarly, no distinction is provided between "normal" and "special" instructions. The advantage of providing five separate indications ("normal" and "priority" letters, "normal" and "special" instructions, and a cursor) simply cannot be achieved by utilizing only two separate arrays.

While the preferred dictation display which has heretofore been commercially available uses a flashing indicator element to represent the present location of the record medium, it has been proposed (but not made available) to energize successive indicator elements as the record medium advances. Thus, depending upon the number of elements which are "on", the length of dictation is indicated. However, when this display is used in a transcribe machine, the "filling in" of indicator elements as the record medium advances tends to obliterate any indication of the locations of "letters" and "instructions".

Another disadvantage of previously available and previously proposed dictation displays is that no indication is provided of the actual location at which dictation commences. For example, let it be assumed that dictation is recorded on a magnetic tape, such as a conventional tape cassette. Let it be further assumed that a fresh cassette is loaded into the dictating machine, but the tape has not been fully rewound. In most machines of the aforementioned type, the electronics therein merely assumes that the tape has been fully rewound and, therefore, the physically left-most indicator element normally is energized initially to indicate that dictation has commenced at the very beginning of the tape. But, this indication may be erroneous if a certain unknown quantity of tape had been advanced prior to the beginning of dictation. Although desirable, such dictation displays do not indicate accurately the relative location along that tape at which dictation actually begins.

Another disadvantage of the aforementioned dictation displays resides in the fact that each indicator element included in the array is associated with the same quantity of record medium, notwithstanding that record media of different capacities or of different recording rates may be used. For example, a typical array may be provided with thirty indicator elements, each element being associated with one minute of dictation. If the record medium comprises a magnetic tape, successive indicator elements are energized for every minute that the tape is transported. If the length of tape has a capacity of thirty minutes of dictation, this correspondence of one minute of dictation to one indicator element is satisfactory. However, if the tape length is sufficient to record sixty minutes of dictation (for example, a conventional C-120 tape cassette), the display is satisfactory only for the first thirty minutes of dictation. Cursor and cue indications for the remaining thirty minutes will not be displayed. Similarly, for tape lengths that accommodate less than thirty minutes of dictation, such as C-30 cassettes or minicassettes, one-half of the array will not be energized and, thus, becomes superfluous. Still further, if the dictating machine is capable of recording at two different speeds (e.g. "normal" and "slow" speeds), as often is the case with equipment that operates with microcassettes, the display may be accurate at one tape speed but not the other. It is, therefore, desirable to vary the represented length of record medium provided by each indicator element in the array. For example, each indicator element may represent thirty seconds of dictation for C-60 cassettes and for microcassettes, may represent fifteen seconds of dictation for minicassettes, and may represent sixty seconds of dictation for C-120 cassettes and for microcassettes which are used at slow speeds.

OBJECTS OF THE INVENTION

Therefore, it is an object of the present invention to provide an improved dictation display which overcomes the disadvantages attending the aforementioned devices.

Another object of this invention is to provide display apparatus for use in dictate and/or transcribe equipment which indicates the types, locations and lengths of different types of recorded messages.

A further object of this invention is to provide dictation display apparatus formed of plural arrays of indicator elements with each indicator element in each array being representative of a selectable length of recording, the selection being varied by the user, as desired.

An additional object of this invention is to provide dictation display apparatus which provides indications of at least two different types of letters, two different types of instructions and a cursor.

Yet another object of this invention is provide dictation display apparatus which provides a relatively accurate indication of the location on the record medium at which dictation actually begins.

A still further object of this invention is to provide a method of displaying lengths, types and locations of respectively different types of messages recorded on a record medium in a dictate/transcribe device.

Another object of this invention is to provide display apparatus in a physically independent display module that is connectable to a record/playback module in a modular dictation/transcription system.

Various other objects, advantages and features of the present invention will become readily apparent from the ensuing detailed description, and the novel features will be particularly pointed out in the appended claims.

SUMMARY OF THE INVENTION

In accordance with this invention, display apparatus for a dictate/transcribe device displays cue indications representing respectively different types of recorded messages and also a cursor indication representing the present relative location of the record medium used with the dictate/transcribe device. Three separate arrays, each formed of energizable indicator elements, are used to display the lengths of recorded messages, the locations of recorded instructions and the present position of the record medium.

As one aspect of this invention, the length of a recorded message is represented by a number of consecutive energized indicator elements in, for example, the first array, and successive messages are displayed as being separated by an extinguished, or "blank" indicator element. As a feature of this aspect "normal" messages, such as letters, are represented by steady-state energized elements and "priority" messages are indicated by flashing elements. Other distinctive indications to distinguish between such messages may be provided.

As another feature, "normal" and "special" instructions are represented by indicator elements which are energized differently in, for example, the second array. In the preferred embodiment, the locations of "normal" instructions are represented by steady-state energized indicator elements and the locations of "special" instructions are represented by flashing elements.

As another aspect of this invention, each indicator element in each array is representative of a preselected length of recording on the record medium, the length representation being changeable, as desired. For example, if the record medium is movable at different recording speeds, the time-length of recording represented by an element may be increased to adjust for slower speeds. As a numerical example, if each array is comprised of sixty seconds, each segment may represent thirty seconds of dictation for "normal" recording speeds and sixty segments of dictation for "slow" recording speeds. Additionally, the time-length of dictation represented by each segment may be adjusted to reflect the actual length of the record medium. As another numerical example, if the record medium comprises a magnetic tape, each segment may represent thirty seconds of dictation for a "normal" tape (e.g. a C-60 cassette, a microcassette or a picocassette), sixty seconds of dictation for a longer tape (e.g. a C-120 cassette) and fifteen seconds of dictation for a shorter tape (e.g. a C-30 cassette or a minicassette).

As yet another aspect of this invention, the farthest advance position reached by the record medium during the recording of a message is displayed and maintained even if the record medium subsequently is advanced without dictation (e.g. if it is "fast-forwarded").

As an additional aspect of this invention, if a record medium, such as a magnetic tape, is loaded into the dictate/transcribe device at an arbitrary location therealong, the display nevertheless provides a relatively accurate indication of the relative position along that tape at which dictation begins. Thus, the beginning of dictation (BOD) position is indicated.

In accordance with this invention, the display is energized both during dictation, as when suitable "cue" switches are actuated by the user, and during transcription, as when the record medium is scanned prior to actual transcription in order to "set up" the display in accordance with "letter" and "instruction" information recorded by the dictator.

Still another aspect of this invention is to provide the method carried out by the aforementioned dictation display apparatus.

A still further aspect of this invention is to provide display apparatus included in a display module that is connectable to but physically independent of a record/playback module in a modular dictation system; the display apparatus being of the aforementioned type.

BRIEF DESCRIPTION OF THE DRAWINGS

The following detailed description, given by way of example, and not intended to limit the present invention solely to the described embodiments, will best be understood in conjunction with the accompanying drawings in which.

DETAILED DESCRIPTION OF CERTAIN PREFERRED EMBODIMENTS

Figure 1:
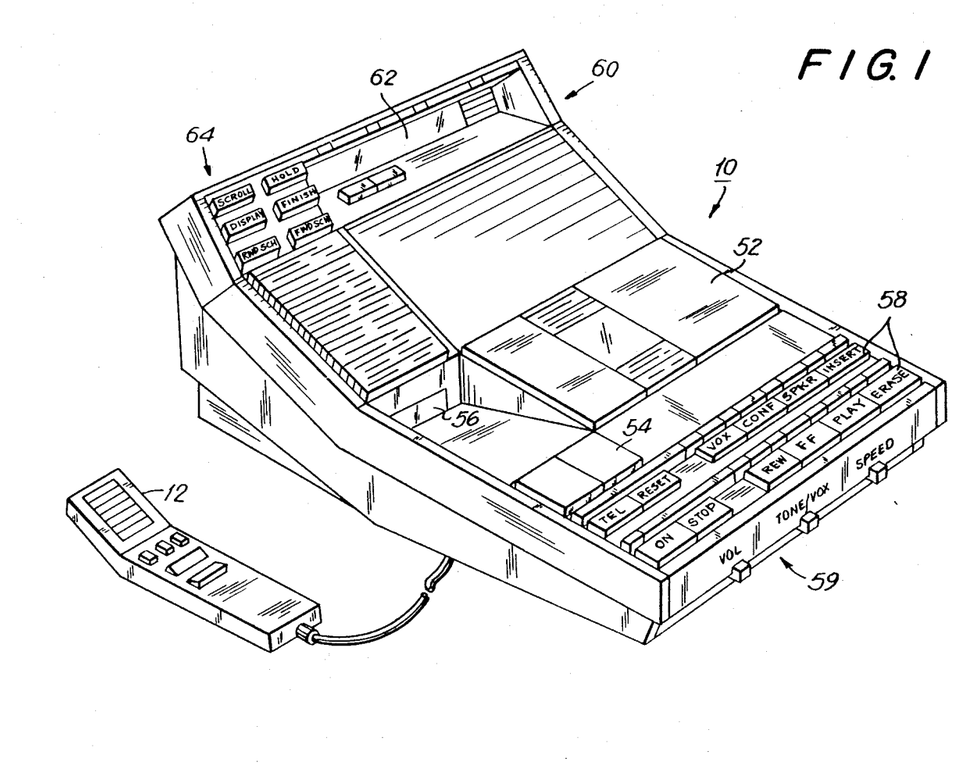
FIG. 1 is a perspective view of a modular dictation system in which the present invention finds ready application.

The present invention may be used advantageously in a modular dictation system of the type described in U.S. application Ser. No. 895,006, filed Aug. 8, 1986, now U.S. Pat. No. 4,817,127, entitled "Modular Dictation/Transcription System". This invention also may be utilized with a plurality of record/playback modules, such as described in U.S. application Ser. No. 894,583, filed Aug. 8, 1986, now U.S. Pat. No. 4,809,116, entitled "Display for Modular Dictation/Transcription System". A preferred embodiment of a modular dictation system in which the present invention is used is illustrated in FIG. 1. This modular dictation system is comprised of a record/playback module 10 and a display module 60, the present invention being incorporated into the display module. The disclosure of copending application Ser. No. 895,006 as well as the disclosure of copending application Ser. No. 894,993, filed Aug. 8, 1988, now abandoned entitled "Display for Modular Dictation/Transcription System" are incorporated herein by reference.

Record/playback module 10 is adapted to record audio messages which are produced by the use of a microphone handset 12 or by the use of a telephone/-dictation terminal of the type described in copending application Ser. No. 895,017, filed Aug. 8, 1986, entitled "Programmable Telephone/Dictation Terminal and Method of Operating Same". Microphone handset 12 is coupled to record/playback module 10 and includes cue switches, or pushbuttons, operable to generate and record letter and instruction cue data on the record medium (e.g. magnetic tape) of module 10, as described in greater detail in application Ser. No. 894,583. For example, the microphone handset may include separate "letter" and "instruction" switches, each operable to generate two types of cue data: "normal" and "priority" message (or letter) cues and "normal" and "special" instruction cues, respectively.

Record/playback module 10 includes a cassette compartment (not shown) protected by a door 52 which, when opened, provides access to that compartment for the loading and unloading of a magnetic tape cassette. An eject button 54 is provided by which a loaded cassette is ejected from the module, resulting in the opening of door 52 and facilitating the removal of that cassette from the cassette compartment. Module 10 also is provided with a display 56 which, typically, provides an indication of the relative position of the recording tape as it is transported during record and playback modes of operation. As an example, display 56 functions as a tape counter to provide a visual indication of a simple 4-digit tape count.

The record/playback module also is provided with various pushbuttons 58 which, when actuated, effect the operations generally designated on those pushbuttons. For example, an ON button is adapted to actuate module 10 to its active mode, whereby dictating operations may be carried out. A TELEPHONE button enables the record/playback module to record telephone calls which are received when module 10 is conditioned to record incoming telephone, calls, as described in application Ser. No. 895,017. A RESET button functions to reset display 56 to a preset indication, such as "0000". This RESET button also may be actuated to reset the display provided on display 62 (to be described) of display module 60. A STOP button included in pushbuttons 58 establishes a quiescent mode of operation for module 10. Typically, the STOP button is actuated to terminate a fast-forward, rewind, playback or record mode of operation.

A VOX button, when actuated, enables record/-playback module 10 to record audio messages so long as a speech signal is present. That is, recording tape is advanced in the presence of such speech signals and is stopped when those speech signals terminate. Such voice-operated recording is well known to those of ordinary skill in the art. A CONFERENCE button establishes a "conference" mode of, recording whereby the amplification of audio signals recorded on the magnetic tape is increased. Preferably, the CONFERENCE button is used in conjunction with a conference microphone (not shown) which, when connected to module 10, permits the recording of a conference among individuals. A SPEAKER button enables the activation of an internal speaker (not shown) provided in module 10. When audio messages recorded on the magnetic tape are played back, such messages are reproduced by that internal speaker. An INSERT button is adapted, when actuated, to establish an "insert" mode of operation whereby audio information is recorded onto a separate channel, or track of the magnetic tape. This feature enables a user to dictate additional material without editing the message which has already been recorded.

A REWIND button, when actuated, rewinds the magnetic tape at a relatively high speed until, for example, the beginning of the tape is reached or the STOP button is actuated. Conversely, a FAST FORWARD button serves to advance the magnetic tape at a relatively high speed. A PLAY button, when actuated, advances the magnetic tape at its normal speed, whereby audio messages recorded thereon are played back. Such played back messages may be reproduced by the internal speaker of record/playback module 10. An ERASE button is adapted to be actuated concurrently with either the REWIND button or the FAST FORWARD button so as to establish an "erase" mode. An electromagnetic erase circuit (not shown) is triggered to erase audio information which may have been recorded previously on the magnetic tape.

Module 10 also is provided with adjustable controls 59 which, for example, may comprise adjustable sliders. Adjustable controls 59 include a volume adjustment for adjusting the volume of the audio signals played back through, for example, the internal speaker of module 10. A tone/vox adjustment adjusts the base and treble response characteristics of the played back audio signals or, alternatively, when the VOX button is actuated, adjusts the sensitivity of the vox circuit (not shown) normally provided in this module. Tape speed during a playback operation in the transcribe mode may be selectively increased or decreased by adjustment of the illustrated speed control.

Display module 60 which also is described in copending application Ser. No. 894,993, the disclosure of which is incorporated herein by reference, includes a display 62 which provides a graphical display at one portion thereof and a digital display at another portion. As described in detail below, the graphical display provides visual information regarding the type and length of each recorded message and also provides displays indicative of the locations of recorded instructions and "special" notes. In addition, a cursor display is provided to indicate the present position of the magnetic tape as it is transported during various dictate operations. The digital display indicates the total length of dictation in minutes and tenths of minutes as such dictation is recorded. Other information also is provided by the digital display during transcribe operations, such as author identification and the length of each message.

Display module 60 also is provided with display control buttons 64. The functions carried out by the individual control buttons are represented by the legends provided on each such button. The SCROLL button, when actuated, permits a user to "scroll" through the various types of messages that may be recorded, such as letters, "priority" letters, instructions or "special" notes. One of these types of messages may be selected for rapid access, as described more particularly in the aforementioned copending applications.

A DISPLAY control button may be selectively actuated to scan a dictated magnetic tape for the purpose of detecting information recorded thereon representing the various types, lengths and locations of messages. This information is used to control display 62 to provide the aforementioned graphical display which is most helpful in preparing for transcription of dictated information. A REWIND SEARCH control button, when actuated, causes the magnetic tape to rewind in order to access a selected type of message. Message selection is made by the operation of the SCROLL button, as mentioned above.

Display control buttons 64 also include a HOLD button which, essentially, "freezes" the information displayed on display 62 such that if a new magnetic tape is loaded into record/playback module 10, messages may be dictated on that new tape without disturbing the display associated with the previous tape. This permits dictation to be resumed on the previous tape without any confusion or ambiguity in the display.

A FINISH control button functions to record a "summary" block of data representing the types, locations and lengths of all messages recorded on a particular magnetic tape. This data, when read prior to transcription, presets display 62 to indicate the types and locations of messages which need transcription. Operation of the FINISH button during a transcribe mode serves to extinguish the display of those messages which have been transcribed.

A FORWARD SEARCH control button serves to advance the magnetic tape at a rapid rate to access a selected type of message. It is appreciated that this control button operates in a manner similar to that of the REWIND SEARCH control button.

Further description of display module 60 is found in copending application Ser. No. 894,993 and below.

Figure 2:
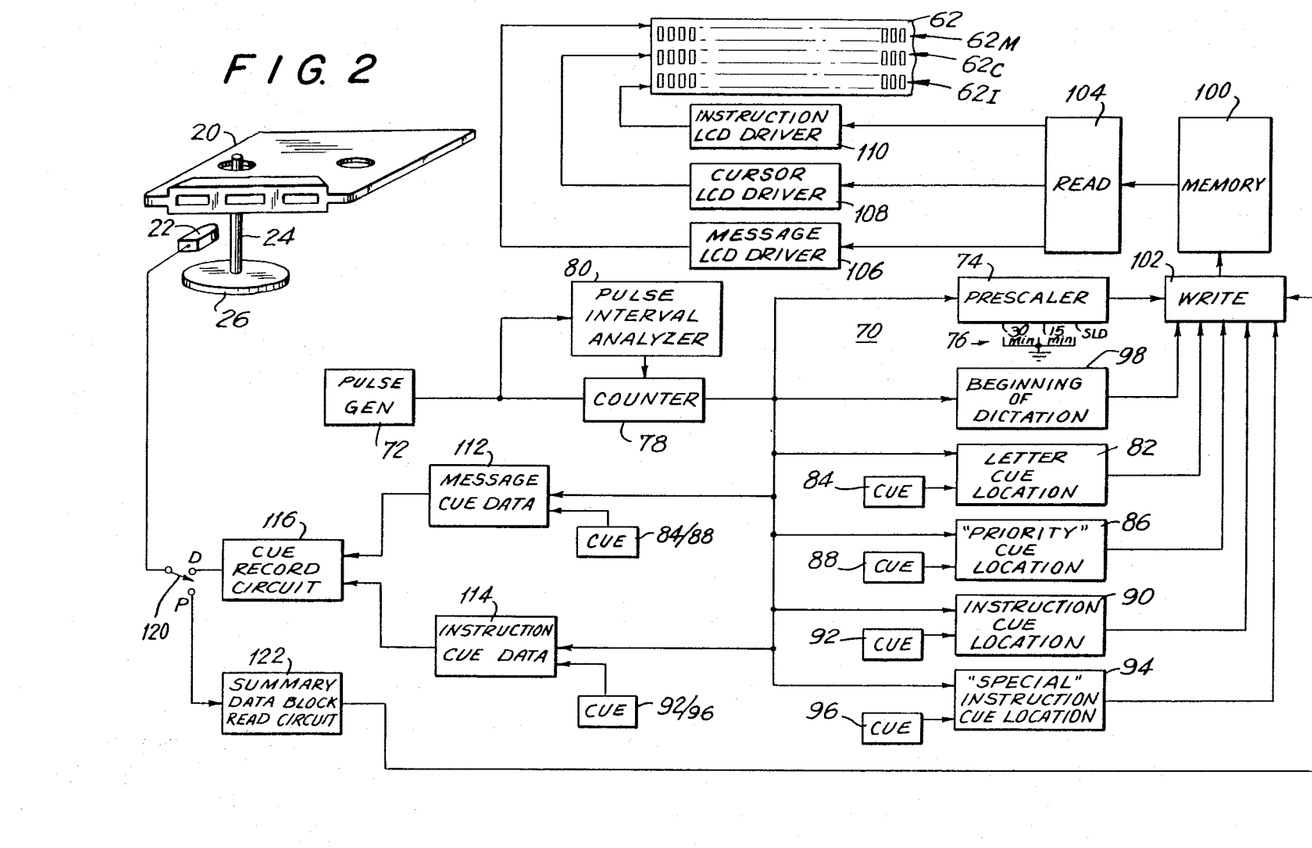
FIG. 2 is a functional block diagram of an embodiment of the present invention.

Turning to FIG. 2, there is illustrated a functional block diagram which is intended to provide a diagrammatic representation of the manner in which display 62 is controlled to provide a visual indication of the length, types and locations of different messages, as well as a cursor indication of the present location of the record tape. Although individual functional blocks are illustrated in FIG. 2, it will be appreciated that, in the preferred embodiment, display 62 is controlled by a microprocessor; and the relevant routines carried out by the microprocessor are described below in conjunction with the flow charts of FIGS. 3-6.

Display control circuit 70, which is intended to be implemented by a microprocessor, as aforementioned, such as an NEC Model 7500 or similar device, is coupled, by way of conventional input and output circuitry, to LCD drivers which, in turn, are connected to respective ones of the individual arrays of LCD segments which constitute display 62. In the preferred embodiment, each array is formed of LCD indicator elements, or segments, but alternative devices are contemplated, such as LEDs, plasma display devices, incandescent lamps, and the like. In accordance with this invention, three separate arrays are disposed linearly and are in alignment with each other. Each array, commonly referred to by those of ordinary skill in the art as "time lines", are designated, for convenience, as arrays $62_M$, $62_C$ and $62_I$. The first array provides visual indications of the lengths and locations of different types of messages (array $62_M$), the second array presents a cursor location representing the present relative position of the magnetic tape as it is transported by the transport mechanism of record/playback module 10 (array $62_C$), and the third array indicates the locations and types of different instructions (array $62_I$). Array $62_M$ provides visual information relating to, for example, "normal" and "priority" letters; and array $62_I$ provides visual information relating to "normal" and "special" instructions and notes. It will be appreciated, nevertheless, that the expressions "letters" and "instructions" are intended to refer to letters, memos, opinions and other such similar categories of messages; and instructions, special notes, and other similar classifications of instructions as may be adopted or selected by a user. Array $62_M$ is adapted to provide two different, distinctive displays and, similarly, array $62_I$ is adapted to provide two different, distinctive displays which differ from the displays provided by array $62_M$. The particular types of messages or instructions that are represented by each array may be "user defined".

Display control circuit 70 is comprised of a pulse generator 72, a counter 78, a pulse interval analyzer 80, cue data generators 82, 86, 90 and 94, a memory 100 and individual LCD drivers 106, 108 and 110. Display control circuit 70 operates in conjunction with a record medium 20 which, for the purpose of the present discussion, is assumed to be a conventional magnetic tape cassette. It will be appreciated that other record media may be used, if desired, such as a minicassette, a microcassette, a picocassette, a magnetic disk, a magnetic sheet or a solid-state recording medium such as a magnetic bubble array or a semiconductor storage device. If record medium 20 comprises a magnetic tape, that tape is transported between supply and take-up reels by a tape transport included in record/playback module 10. FIG. 2 illustrates a supply reel drive spindle 24 which, when the tape is transported in the forwarded direction, merely rotates as the tape is payed out; this drive spindle being driven by suitable mechanisms (not shown) to rewind the magnetic tape. A chopper wheel 26 is coupled to supply reel spindle 24 and, thus, rotates as the tape is transported. The chopper wheel may be a conventional device which cooperates with pulse generator 72 to generate a series of pulses as the tape moves. Typical examples of chopper wheel 26 include an optical chopper wheel, such as described in U.S. Pat. No. 4,200,893, a magnetic chopper wheel, such as described in U.S. Pat. No. 4,378,577 or a mechanical chopper wheel in which an electro-mechanical switch is opened and closed as the wheel rotates. In any event, it will be appreciated that the pulses (referred to as "chopper pulses") produced by pulse generator 72 exhibit a repetition rate determined by the rotary speed of the chopper wheel. During normal tape speeds used during the recording and playing back of messages, the pulse repetition rate, or interval between successive pulses, varies as a function of the diameter of the tape wound upon the supply reel. As this tape diameter decreases, the pulse repetition rate increases. Of course, during fast forward and rewind tape motions, the pulse repetition rate is relatively high.

Pulse generator 72 is coupled to pulse counter 78. As tape is transported in the forward direction, the count of pulse counter 78 is incremented; and as tape is transported in the reverse direction, the pulse count is decremented. A suitable direction signal (not shown) is applied to counter 78. As will be described below, the pulses generated by pulse generator 72 also are supplied to pulse interval analyzer for analysis of the interval between successive pulses and for presetting counter 78 to a count determined by that interval, thereby providing a count representing the location along the tape at which dictation begins.

Tape counter 78 is coupled to a prescaler 74 which functions to divide the count of counter 78 by a variable dividing ratio. In particular, the dividing ratio may vary as a function of the length of tape which is used and/or the speed at which the tape is transported for dictation. This ratio may be selected by, for example, selector switches 76 which, in the illustrated embodiment, are adapted to select a dividing ratio for a thirty minute tape (e.g. a so-called C-60 tape cassette), for a fifteen minute tape (e.g. a C-30 tape cassette), or when a slow recording speed is adopted.

Counter 78 is coupled to cue data generators 82, 86, 90 and 94. In addition, the counter is provided with a preset input coupled to pulse interval analyzer 80 which, as mentioned above, functions to analyze the time interval between successive chopper pulses during recording, thereby ascertaining the actual location of the magnetic tape relative to its beginning. It may turn out that, when a fresh cassette is loaded into record/playback module 10, the tape therein might not be fully rewound. Pulse interval analyzer 80 measures the interval between successive chopper pulses to preset counter 78 with a count representing the arbitrary location of the tape at which dictation actually begins.

Figure 8:
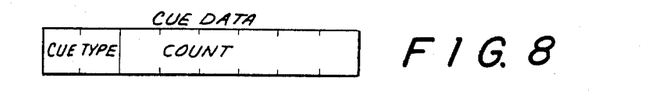
FIG. 8 is a schematic representation of digital cue data that is processed by the present invention.

The cue data generators coupled to counter 78 comprise a letter cue data generator 82, a "priority" cue data generator 86, an instruction cue data generator 90 and a "special" instruction cue data generator 94. Each cue data generator is coupled to a respective one of cue signal indicators 84, 88, 92 and 96, as illustrated. These cue signal indicators are triggered in response to cue switches provided in, for example, microphone handset 12 (FIG. 1) and are adapted to generate cue indication signals. More particularly, letter cue signal indicator 84 is coupled to letter cue data generator 82 to supply a signal thereto when a "letter" cue switch is operated by the user, to indicate the end of a "normal" letter (or other user defined message classification). "Priority" cue signal indicator 88 is coupled to "priority" cue data generator 86 and, when the "letter" cue switch is operated twice in succession, supplies a signal representing the end of a "priority" letter. Instruction cue signal indicator 92 is coupled to instruction cue data generator 90 and, when an "instruction" cue switch is operated, supplies a signal representing the beginning of a "normal" instruction. Finally, "special" instruction cue signal indicator 96 is coupled to "special" instruction cue data generator 94 and, when the "instruction" cue switch is operated twice in succession, supplies a signal representing the beginning of a "special" instruction. Each cue data generator responds to the cue signal supplied thereto to produce a digital representation of the type of cue that is recorded (i.e. a letter, a "priority" letter, an instruction or a "special" instruction, or other user defined type of message) as well as an indication of the location on the tape at which cue indicia are recorded. The cue signal indicators preferably are provided by the software of the microprocessor used to implement the illustrated display control circuit. FIG. 8 is a schematic representation of digital cue data character having, for example, two bytes representing the type of cue data (i.e. letter, "priority" letter, instruction or "special" instruction) and a plurality of bytes representing the count reached by counter 78 at the time that the respective cue switch is operated. Thus, the cue data character generated by each of the respective cue data generators represents the type and location of that cue.

Counter 78 also is coupled to a beginning of dictation (BOD) register 98. This register temporarily stores the count of counter 78 produced at the tape start position when dictation begins. BOD register 98 and each of cue data generators 82, 86, 90 and 94, are coupled to a write circuit 102 associated with memory 100. As shown in FIG. 2, prescaler 74 also is coupled to this write circuit.

The write circuit operates under microprocessor control to store in respective, addressable locations of memory 100 the cue data characters generated by each of the cue data generators, the BOD count provided by BOD register 98 and the instantaneous count of counter 78 as divided by prescaler 74. The memory may include a cursor location which is updated by counter 78, a BOD location for storing the BOD count, and letter and instruction locations. The letter and instruction locations may, for example, include a predetermined number of addresses at which each letter or "priority" or instruction or "special" instruction cue data character is stored. For example, memory 100 may be provided with thirty separate addresses for storing up to thirty different letter or "priority" or instruction or "special" instruction (or any combination thereof) cue data characters. In one embodiment, one of these addresses is used to store a summary data block character of a type described in copending application Ser. No. 894,582, the disclosure of which is incorporated by reference. Hence, only twenty-nine cue data characters may be stored.

A read circuit 104 is coupled to memory 100 to read out the cursor count, the BOD count and the respective cue data characters stored in the memory. Read circuit 104 is coupled to message LCD driver 106 to supply thereto the letter and "priority" cue data characters read from memory 100. The read circuit also is coupled to cursor LCD driver 108 to supply thereto the cursor count read from the memory. Still further, the read circuit is coupled to instruction LCD driver 110 to supply thereto each of the instruction and "special" instruction cue data characters read from memory 100. Thus, the appropriate ones of the segments included in arrays $62_M$, $62_C$ and $62_I$ are energized to display, respectively, the length of each letter and "priority" letter and the location at which each letter and "priority" letter ends, the present position of the recording tape and the location at which each instruction and "special" instruction is recorded. It will be appreciated that the count information included in each cue data character (FIG. 8) serves to identify a respective segment included in the appropriate array $62_M$, $62_C$ and $62_I$ for selective energization.

Depending upon the "cue type" data included in the cue data character of FIG. 8, the LCD driver energizes the appropriate LCD segments either as steady-state energization or flashing energization. In the preferred embodiment, "normal" letters are represented by steady-state energized segments and "priority" letters are represented by flashing segments. Similarly, the location at which a normal instruction begins is represented by a steady-state energized LCD segment and the location at which a "special" instruction begins is represented by a flashing segment. It also will be appreciated, nd will be described in further detail below, that as a letter (or other user defined message) is dictated, successive segments of array $62_M$ are energized as the count of counter 78 increments. When letter cue switch 84 or "priority" cue switch 88 is closed, the LCD segment included in array $62_M$ which corresponds to the count of counter 78 is extinguished, or blanked. Thus, a dictated letter is represented by a "block" of energized LCD segments, and the end of that letter and the beginning of the next-following letter is represented by a blanked segment. Of course, depending upon whether letter cue signal indicator 84 or "priority" cue signal indicator 88 is triggered, the "block" of segments remain energized either to provide a steady-state indication or a flashing indication.

The BOD count provided by BOD register 98 and stored in memory 100 identifies the left-most segment in each of arrays $62_M$, $62_C$ and $62_I$ at which dictation commences. Thus, when the first letter is dictated onto the recording tape, the left-most segment included in array $62_M$ to be energized is determined by the BOD count. Likewise, the left-most segment included in cursor array $62_C$ to be energized is determined by the BOD count. In the event that the record tape had not been fully rewound prior to the beginning of dictation, the segment included in arrays $62_M$ and $62_C$ which represent the beginning of dictation might not be the physically left-most segment included therein. In that event, and as will be described, if the tape is rewound to a position prior to the BOD count, cursor LCD driver 108 drives array $62_C$ so as to move the cursor indication to the left of the first-energized segment included in array $62_M$ while the segments included in array $62_M$ between the location of the cursor and the beginning of the first-dictated letter are "filled in".

Memory 100 also is provided with a location in which the highest scaled count reached by counter 78 during dictation is stored. This count is referred to as the "farthest advance" count and, usually, is displayed by the right-most energized segment included in array $62_M$ (it is appreciated that the right-most energized segment is not necessarily the physically right-most segment included in the array). In the event that the recording tape is advanced beyond the farthest advance position, cursor LCD driver 108 drives array $62_C$ so as to shift the cursor indication therein to the right of this farthest advance position. Should dictation then re-commence, those segments included in array $62_M$ which are disposed between the farthest advance position and the present cursor position are "filled in".

Display control circuit 70 also includes a message cue data block generator 112 and an instruction cue data block generator 114. These respective cue data block generators are adapted to generate cue data blocks which include cue data characters of the type shown schematically in FIG. 8 for the purpose of recording such cue data blocks on the record tape itself. Cue data block generators 112 and 114 are described more particularly in copending application Ser. Nos. 894,993 and 894,582. It will be appreciated that, if desired, these cue data block generators may be omitted and the information produced thereby may, alternatively, be the information produced by cue data generators 82, 86, 90 and 94. As shown, message cue data block generator 112 is coupled to letter cue signal indicator 84 and "priority"

cue signal indicator 88; and instruction cue data block generator 114 is coupled to instruction cue signal indicator 92 and to "special" instruction cue signal indicator 96. The outputs of the cue data block generators are coupled to a cue record circuit 116 which, in turn, is connected by a dictate/playback switch 120 to record/playback head 22.

As described in copending application Ser. No. 894,993, cue data blocks are recorded as modulated tone signals, preferably FSK signals, immediately following each letter or "priority" letter, and immediately in advance of each recorded instruction or "special" instruction. Cue record circuit 116 includes the necessary tone modulating circuitry to effect this FSK recording. In addition, and as described in the just-mentioned copending application, a summary data block may be recorded, if selected by the user, following the last of the dictated messages. This summary data block is comprised of the information included in each of the individually recorded cue data blocks. In one embodiment, the summary data block is recorded by reading from memory 100 all of the cue data characters stored therein, this information then being used to modulate a tone signal (such as FSK modulation) for recording.

Display control circuit 70 also is used to control display 62 during a transcribe operation. In the preferred embodiment, prior to transcription of the messages dictated onto the record tape, the tape is scanned to read therefrom the summary data block that had been recorded following the last-dictated message. A summary data block read circuit 122 is coupled to record/playback head 22 by dictate/playback switch 120 for the purpose of detecting this summary data block. The output of the summary data block read circuit is coupled to memory 100 via write circuit 102 so as to load into the memory the very same cue data and BOD position data that had been generated during the dictate operation. This summary data block reading/loading operation is carried out during a scan operation, as described in copending application Ser. No. 894,993.

Although not shown in FIG. 2, display control circuit 70 also is adapted to detect from the record tape each recorded cue data block, and to load the cue data characters included in each detected block into memory 100. In this regard, the record tape is scanned by, for example, rewinding the record tape prior to transcription. As the tape is rewound, each cue data block recorded thereon is sensed; and the cue data character included therein is read and then written into memory 100.

The operation of the functional block diagram illustrated in FIG. 2 now will be described. Initially, let it be assumed that a fresh record tape is loaded into record/playback module 10, and this fresh tape is fully rewound. Then, as the tape is advanced during a dictate operation, the chopper pulses produced by pulse generator 72 are analyzed by pulse interval analyzer 80. Since the tape has been fully rewound, the pulse interval analyzer determines that the interval between successive chopper pulses corresponds to the interval normally produced at the beginning of the record tape; and counter 78 is preset to a corresponding count representative thereof. This count is stored temporarily in BOD register 98; and the BOD count is written into memory 100. As a result, message LCD driver 106 energizes the first, or physically left-most segment included in array $62_M$. Thus, a visual indication is provided of the location along the record tape at which dictation actually begins. Additionally, the count of counter 78 is prescaled by prescaler 74 and written into the cursor location of memory 100 from which this count is read to cursor LCD driver 108. Consequently, the physically left-most segment included in array $62_C$ is energized to provide a cursor indication of the present position of the record tape.

As dictation proceeds, the count of counter 78 is incremented and, as a result, the cursor display likewise advances along array $62_C$ in a left-to-right direction. Moreover, successive ones of the segments included in array $62_M$ are energized and remain energized, thereby providing a steady state indication of the increased length of the dictated message.

If the author wishes to review a portion of the message he is dictating, the tape need merely be rewound; resulting in a decrementing of the count of counter 78. As the count decrements, a scaled decrementing count is written into the cursor locations of memory 100 and, when read therefrom, cursor LCD driver 108 energizes array $62_C$ to provide a moving cursor indication in the right-to-left direction. However, the count reached by counter 78 just prior to the reversal of the record tape remains stored in the farthest advance location in memory 100, thus maintaining the steady state energization of all of those segments in array $62_M$ which had been energized immediately prior to such tape reversal.

Figure 7A:
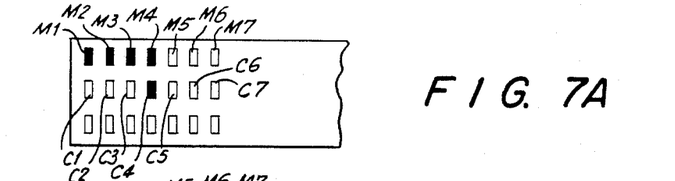
FIGS. 7A-7G are schematic representations of portions of the display in accordance with the present invention and are useful in understanding various operational features thereof.

FIG. 7A is a schematic representation of the manner in which display 62 is selectively energized during the aforementioned operation. Consistent with the assumption that the record tape had been fully rewound prior to commencing dictation, FIG. 7A illustrates the energization of, for example, segments M1, M2, M3 and M4 in array $62_M$ as dictation proceeds. It is recognized that these segments are turned on, one-at-a-time, and they remain on to indicate the present length of the dictated message. FIG. 7A also illustrates that segment C4 in array $62_C$ is energized, thus providing a cursor indication of the present position of the record tape. Should the tape now be reversed, segments M1, M2, M3 and M4 remain energized, but segment C4 will be deenergized and next-preceding segment C3 will be energized, as counter 78 is decremented. Thus, the farthest advance position reached by the record tape during dictation remains displayed by segments M1–M4 of array $62_M$.

Let it be assumed that dictation proceeds until the count of counter 78 has been incremented to a count sufficient to energize all of segments M1–M5 of array $62_M$. At this point, it is assumed that the author actuates the letter cue switch once, resulting in the generation of a cue data character by letter cue data generator 82. This letter cue data character is stored in memory 100; and when read therefrom, message LCD driver 106 extinguishes, or blanks, segment M5 in array $62_M$. However, the preceding segments M1–M4 remain energized in the steady state mode. It will be appreciated that, if the author had actuated the letter cue switch twice, thus indicating the end of a "priority" letter, "priority" cue data generator 86 will generate the cue data character to be stored in memory 100, and when this cue data character is read from the memory, the message LCD driver will extinguish segment M5 and, moreover, will flash all of the preceding segments M1–M4 to represent the length of a "priority" letter. Thus, depending upon how the letter cue switch is actuated, a different, distinctive indication is provided of the type of message that had been recorded.

It will be appreciated that, when a letter cue data character is generated by letter cue data generator 82, a letter cue data block is generated by message cue data block generator 112 and recorded, by cue record circuit 116 and record/playback head 22 on the record tape immediately following the just-dictated letter.

Figure 7B:
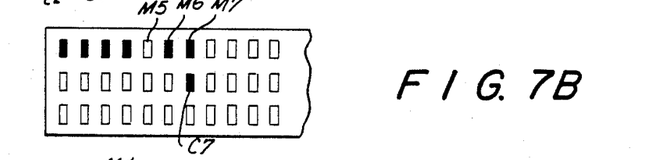

After recording a letter cue data block (also referred to as an end-of-letter cue), the author may dictate another message. The beginning of this message is indicated by the steady state energization of segment M6 in array $62_M$, and the scaled count of counter 78 is loaded into the cursor location of memory 100 so as to drive cursor LCD driver 108 to energize segment C6 of array $62_C$. As dictation proceeds, successive segments in array $62_M$ are turned on, as before, and the cursor indication provided by array $62_C$ advances in the left-to-right direction as counter 78 is incremented. FIG. 7B illustrates that dictation has proceeded to the extent that segments M6 and M7 both are turned on and the cursor indication has advanced to segment C7.

If, during dictation, the author actuates the instruction cue switch once, a corresponding instruction cue data character is generated by cue data generator 90. If the instruction cue switch is actuated twice, cue data generator 94 generates the instruction cue data character. Hence, the cue data character representing the type of cue (instruction or "special" instruction) and the count of counter 78 at the time that the cue data switch was closed is stored in memory 100. The segment included in array $62_I$ which is identified by the count included in this instruction cue data character is energized. Furthermore, instruction LCD driver 110 energizes this segment to provide either a steady-state indication or a flashing indication, depending upon whether a "normal" or "special" instruction is to be dictated. As dictation of the instruction proceeds, the segments included in array $62_M$ continue to be energized in a successive manner. These segments thus represent the length of the dictated instruction; and the particular segment which had been energized in array $62_I$ represents the location of that instruction.

An instruction cue data block which includes the aforementioned letter cue data character is generated by instruction cue data block generator 114 and recorded, via cue record circuit 116 and record/playback head 22, on the record tape.

Figure 7C:
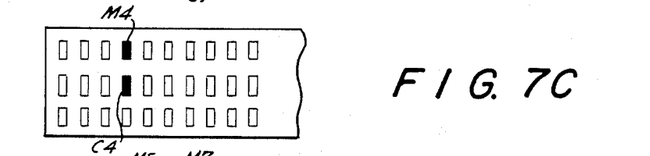

The foregoing description has assumed that, when the record tape first was loaded into record/playback module 10, it had been fully rewound prior to the beginning of dictation. Let it now be assumed that an arbitrary, unknown quantity of tape is wound upon the take-up reel, and this tape is not rewound prior to the beginning of dictation. Now, when dictation commences, the chopper pulses produced by pulse generator 72 are analyzed by pulse interval analyzer 80. After measuring the interval between the first few pulses supplied thereto, the pulse interval analyzer presets counter 78 to a count representative of the actual location of the record tape at which dictation commences. FIG. 7C illustrates one example of the preset counter, wherein segment M4 in array $62_M$ constitutes the leftmost energized segment at the beginning of dictation; and segment C4 in array $62_C$ represents the cursor indication of the present location of the record tape.

Figure 7D:
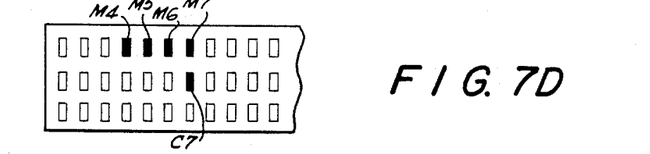

Dictation now may proceed in a manner similar to that described above; and as the count of counter 78 is incremented, successive segments included in array $62_M$ are turned on to indicate the length of the message being dictated. Concurrently, successive segments in array $62_C$ are energized, one-at-a-time, to provide a cursor indication as the tape is transported. FIG. 7D illustrates that, when the tape has been transported by an amount such that the cursor advances to segment C7, the length of the dictated message is indicated by segments M4, M5, M6 and M7, all of which are turned on.

Figure 7E:
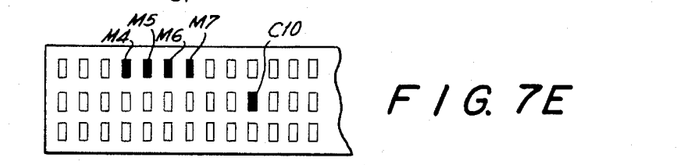

Let it be assumed that, when dictation has reached the point represented by FIG. 7D, the author advances the record tape in a fast forward mode of operation. The count reached by counter 78 just prior to such fast forward movement of the tape is stored in the fast forward location of memory 100. As the tape advances, counter 78 is incremented and, as a result, the cursor indication proceeds in its left-to-right direction. However, since a message is not now in the process of being dictated, no additional energization of the segments included in array $62_M$ occurs. FIG. 7E thus illustrates that the dictated message is of the length indicated by segments M4-M7, all of which are turned on, and the tape has been advanced to a position represented by the cursor indication provided by segment C10. Now, with the record tape at the position represented by C10, if dictation re-commences, those segments included in array $62_M$ which lie between the farthest advance position M7 and the present position of the record tape M10 all are turned on.

Figure 7F:
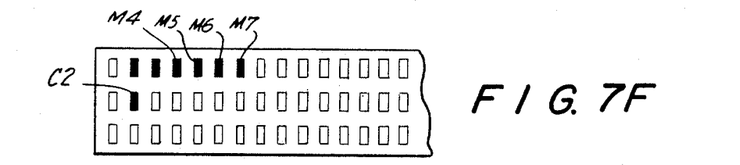
Figure 7G:
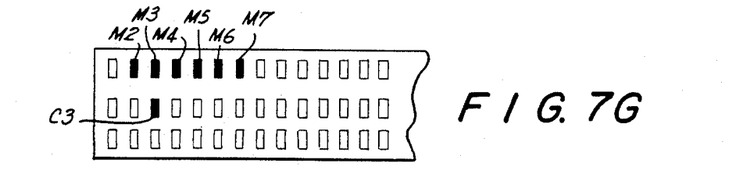

FIG. 7E illustrates the display which arises from the fast forward movement of the record tape beyond the farthest advance position. Let it be assumed that the record tape is rewound. This rewinding of the tape results in a decrementing of counter 78 and, as a result, cursor LCD driver 108 energizes successive, preceding segments in array $62_C$ in the right-to-left direction If the tape is rewound to a position which precedes the BOD count, the cursor indication continues to be driven in the right-to-left direction and the segments in array $62_M$ which precede segment M4 likewise are driven, resulting in the display represented by FIG. 7F. It is assumed herein that the record tape has been rewound to a position such that the count of counter 78 is decremented to a value whereby segment C2 of array $62_C$ is energized. If the record tape now advances to increment counter 78, segment C2 is turned off and the next adjacent segment C3 is turned on, thus providing a suitable cursor indication of the present position of the tape.

When the author wishes to indicate the end of a dictated message, the letter cue switch is actuated (either once or twice), causing the segment in array $62_M$ which is aligned with the cursor indication provided by array $62_C$ to be extinguished, or blanked. Then, when the next message is dictated, the segment included in array $62_M$ which next-follows the blanked segment is turned on. Additionally, those segments which represent the length of the previously dictated message are energized either in a steady-state mode, to indicate a "normal" letter, or in a flashing mode to indicate a "priority" letter. Thus, the length and type of the dictated message are indicated.

It will be appreciated that, if the instruction cue switch is actuated during dictation (either once or twice), the particular segment included in array $62_I$, as identified by the count of counter 78, is energized. This segment is turned on either in a steady-state mode to indicate a "normal" instruction, or in a flashing mode to indicate a "special" instruction. Thus, the locations and types of instructions also are indicated by means of array $62_I$.

Cue data block generators 112 and 114 respond to the actuation of cue signal indicators 84, 88, 92 and 96 (which are triggered by the operation of the letter or instruction cue switches) to generate cue data blocks which include the cue data characters stored in memory 100. The cue data blocks generated by cue data block generators 112 and 114 are recorded on the record tape in the manner mentioned above and, described more particularly in copending application Ser. No. 894,993.

The cue data information stored in memory 100 may, upon operator actuation, be read out and recorded on the record tape in a summary data block immediately following all of the dictated messages. This summary data block subsequently is read during a scanning operation prior to transcribing the dictated messages. As shown in FIG. 2, and as mentioned above, the summary data block is reproduced from the tape by record/playback head 22 and supplied to memory 100 by summary data block read circuit 122. Thus, prior to carrying out a transcribe operation, the cue data information which had been stored in memory 100 during a dictate operation is reproduced and stored therein for the purpose of energizing arrays $62_M$ and $62_I$ to provide a visual indication of the locations of dictated letters and instructions which now should be transcribed. It will be appreciated that read circuit 104 and the individual LCD drivers 106, 108 and 110 operate on the cue data information that is written into memory 100 by summary data block read circuit 122 in the same manner as these circuits operate upon the cue data information that had been written into memory 100 by cue data generators 82, 86, 90 and 94. Of course, if desired, a separate memory may be provided to store the cue data information that is reproduced from the record tape.

Figure 3:
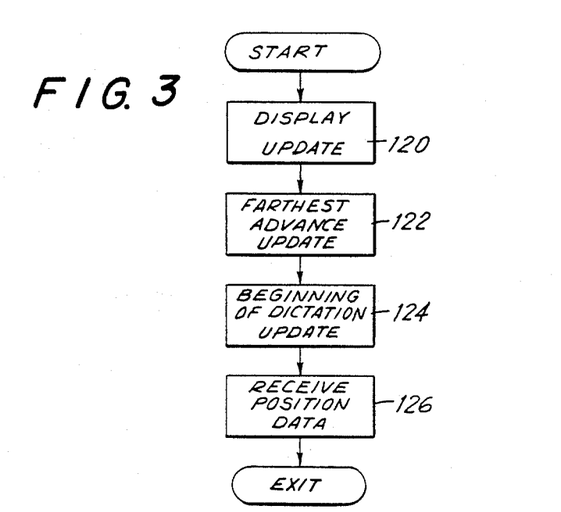
FIGS. 3-6 are flow charts representing the microprocessor-implementation of the present invention.

The manner in which the microprocessor operates to carry out the functions discussed above in conjunction with the functional block diagram illustrated in FIG. 2 now will be described with reference to the flow charts shown in FIGS. 3–6. FIG. 3 represents the primary routine carried out by the microprocessor, this primary routine being comprised of subroutines identified as display update subroutine 120, farthest advance update subroutine 122, beginning of dictation update subroutine 124 and receive position data subroutine 126.

The display update subroutine functions to read the cue and position data information from memory and energize the appropriate ones of the various segments included in arrays $62_M$, $62_C$ and $62_I$ It is appreciated that this display update subroutine thus energizes display 62 to provide the visual indication of the lengths and type of messages dictated onto the record tape, and the types and locations of dictated instructions. The display update subroutine is carried out both during a dictate operation and a transcribe operation.

The farthest advance update subroutine functions to increment the farthest advance position count if the record tape advances during a dictate operation and, moreover, to determine if the record tape has been advanced beyond the farthest advance position. The beginning of dictation update subroutine functions to determine if the record tape has been rewound to a position prior to the BOD position. The receive position data subroutine functions to write into memory 100 the count of counter 78 and the various cue data characters which may be generated by cue data generators 82, 86, 90 and 94.

Figure 4:
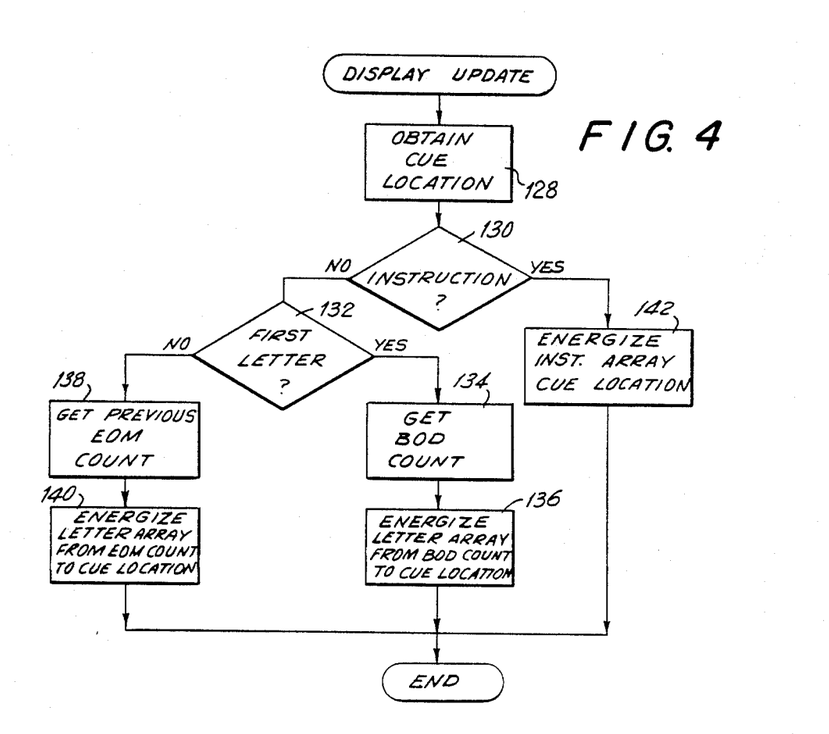

Turning to FIG. 4, the display update subroutine is illustrated in greater detail. If a cue switch is actuated, the present count of counter 78 is obtained and is designated the cue location, as represented by instruction 128. The subroutine then advances to inquiry 130 to determine if the actuated cue switch is the "letter" switch or the "instruction" switch. Assuming that the "letter" switch is actuated, inquiry 130 is answered in the negative and the subroutine advances to inquire, at 132, if this is the first letter which is recorded. If inquiry 132 is answered in the affirmative, the subroutine advances to instruction 134 to retrieve the BOD count. Then, all of the segments which extend from the segment identified by the BOD count to the present cue location are energized, as represented by instruction 136. If a "normal" letter has been dictated, as represented by a single actuation of the letter cue switch, these segments are energized to provide a steady-state indication. However, if a "priority" letter is dictated, that is, if the letter cue switch is actuated twice, the segments included in array $62_M$ which extend from the BOD count to the present cue location are flashed. Then, although not indicated in FIG. 4, the segment corresponding to the cue location is blanked to indicate the end of the letter.

If inquiry 132 is answered in the negative, that is, if this dictated letter is not the first letter, the previous letter cue count (referred to in instruction 138 as the EOM count) is read from memory. Then, the subroutine advances to instruction 140 to energize those segments included in array $62_M$ which extend from the preceding letter cue (EOM) count to the present cue location. As before, if the letter cue switch is actuated once, these segments are energized to provide a steady-state indication. However, if the letter cue switch is actuated twice, these segments are flashed. The segment corresponding to the present cue location count is extinguished, thereby providing a visual indication of the location of the end of this dictated message.

If inquiry 130 is answered in the affirmative, that is, if the instruction cue switch is actuated, the segment included in array $62_I$ which is identified by the cue location obtained via instruction 128 is energized. This segment is energized at a steady state if the instruction cue switch is actuated once, and it is flashed if the instruction cue switch is actuated twice.

After energizing/extinguishing the appropriate segments in array $62_M$ or array $62_I$, the microprocessor exits from the display update subroutine.

The foregoing has described the display update subroutine during a dictate operation. It will be appreciated that a similar operation is carried out during a transcribe operation, with the modification that the cue location which is obtained by instruction 128 is not obtained from counter 78 when a cue switch is closed; but, rather, the cue location is obtained from the cue data information which had been loaded into memory 100 during a tape scan operation.

Figure 5:
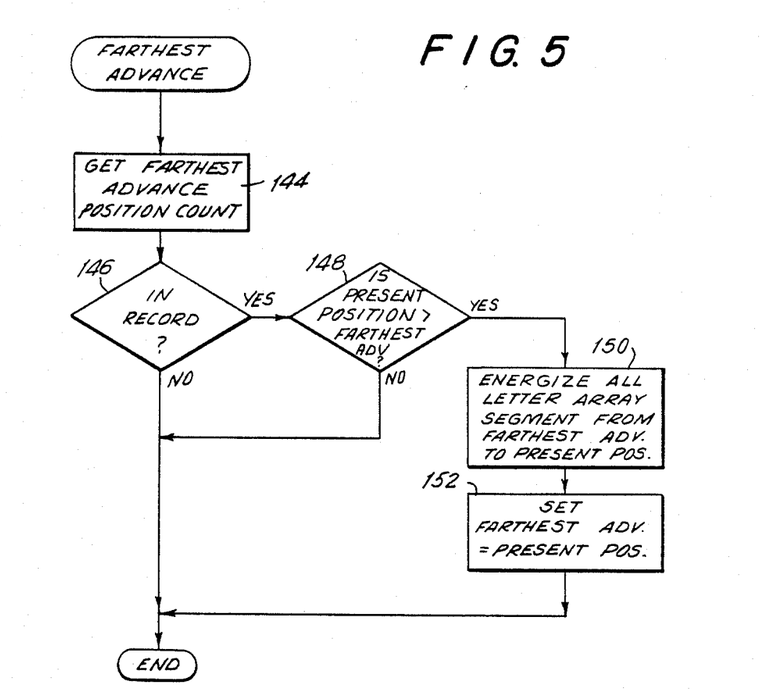

The farthest advance update subroutine is illustrated by the flow chart shown in FIG. 5. This subroutine is carried out during a record operation and, as illustrated, instruction 144 retrieves the farthest advance position count from, for example, the farthest advance location of memory 100. It is recalled that the farthest advance position count is the count last reached by counter 78 during a record operation.

The subroutine then advances to inquiry 146 to determine if the record/playback module is operating in its record mode. If this inquiry is answered in the negative, the microprocessor merely exits the farthest advance update subroutine. However, if inquiry 146 is answered in the affirmative, the subroutine advances to inquiry 148 to determine if the present position of the record tape is greater than the farthest advance position count. If not, the microprocessor exits the routine.

However, if inquiry 148 is answered in the affirmative, the farthest advance update subroutine advances to instruction 150 to energize all of the segments included in array $62_M$ which extend from the farthest advance position count to the present position. "All" of the segments may be merely the next segment. Then, instruction 152 is carried out to set the farthest advance position count equal to the present position count. Thereafter, the microprocessor exits the farthest advance update subroutine.

Figure 6:
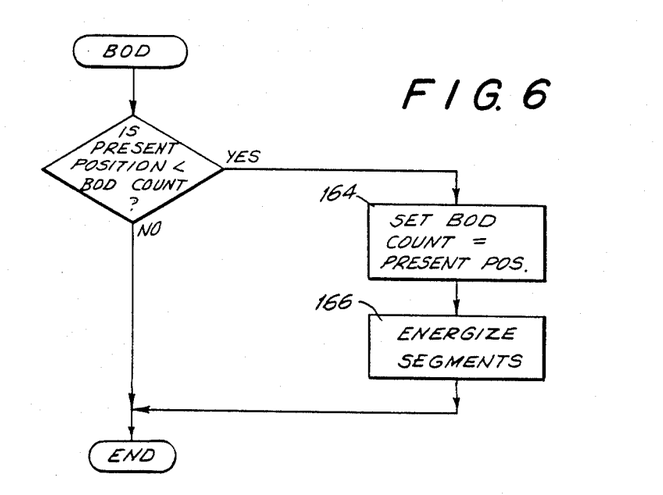

FIG. 6 is a flow chart of the beginning of dictation (BOD) update subroutine. It is recalled that, when dictation begins, counter 78 is preset by pulse interval analyzer 80 to exhibit a count representative of the actual location of the record medium, even though an unknown arbitrary quantity of tape might not be fully rewound. This preset count is stored temporarily in BOD register 98; and this BOD position count is written into memory 100. The BOD update subroutine begins with inquiry 160 which determines whether the present position count exhibited by counter 78 is less than the stored BOD count. If this inquiry is answered in the negative, the microprocessor simply exits this subroutine.

However, if the present position count is less than the BOD count, thus indicating that the record medium has been rewound to a position which precedes the BOD position, the subroutine advances to instruction 164 to set the BOD count equal to the present position count, and then those segments of array $62_M$ which are disposed between the BOD count and the present position count are energized, as represented by instruction 166. Then, the microprocessor exits this BOD update subroutine.

While the present invention has been particularly shown and described with reference to preferred embodiments, it will be readily appreciated by those of ordinary skill in the art that various changes and modifications may be made without departing from the spirit and scope of the invention. For example, the different, distinctive displays which may be used to indicate "normal" letters and "priority" letters, as well as "normal" instructions and "special" instructions, need not be limited solely to light indicator elements which are energized at a steady-state or are flashed. Other distinctive indications may be provided. For example, indicator elements of two different colors may be used, one color to indicate "normal" letters and another color to indicate "priority" letters. Similar two-color indicator elements may be used to distinguish between "normal" and "special" instructions. Still further, each segment in the "letter" and each segment in the "instruction" array actually may be constructed as dual segments having two separate, independent indicator elements disposed in, for example, a common package. Such dual element packages may be used to implement two-color arrays.

As another alternative, and as mentioned above, display 62 need not be limited solely to display indications relating to letters and instructions. The classifications of the various messages that may be represented by the arrays comprising display 62 are user defined. The arrays thus may be used to provide information representing letters, memos, notes, instructions, trip reports, expense accounts, etc. The provision of different, distinctive energizations of the respective arrays permits a common array to provide visual indications relating to at least two different types of messages.

Moreover, although the end of one message and the beginning of the next-following message preferably is represented by an extinguished, or blanked segment included in, for example, array $62_M$, it is appreciated that other manifestations may be used to provide this indication. For example, a particular segment may be energized to provide a much greater intensity or different color to designate the end of a message.

As mentioned above, the preferred embodiment of the present invention is implemented by a microprocessor. Nevertheless, FIG. 2 illustrates a functional block diagram representative of the conceptual manner in which the microprocessor operates to control display 62. As pointed out in copending application Ser. No. 894,993, portions of the circuitry which generate chopper pulses and cue signals are provided in record/playback module 10, and other portions of the circuitry which utilize those chopper pulses and cue signals to control the energization of display 62 are provided in display module 60. While the present invention preferably is utilized in a modular dictation system, it will be appreciated that the dictation display described herein may be totally incorporated into an integral record/playback device. That is, the present invention need not necessarily be limited solely to a modular system.

It is intended that the appended claims be interpreted as including the preferred embodiments described herein, the aforementioned alternatives and other equivalents thereto.

What is claimed is:

1. Display apparatus for a dictate/transcribe device, said dictate/transcribe device providing location signals representative of the location of a record medium and cue signals representative of the generation of cues, in which cue indications representing respectively different types of recorded messages are displayed and a cursor indication representing the present location of the record medium used with said device also is displayed, said apparatus comprising:
    a first display array of selectively energizable indicator elements for providing visual indications of the lengths of recorded messages;
    a second array of selectively energizable indicator elements for providing visual indications of the positions on said record medium of recorded instructions;
    a third array of selectively energizable indicator elements for providing a visual indication of the present relative location of said record medium; and
    control means responsive to the cue signals, the location signals, and dictation for controlling said first, second and third arrays to provide their respective visual indications concurrently.

2. The apparatus of claim 1 wherein each indicator element in each array is representative of a pre-selected length of said record medium; and further comprising means for selecting the length represented by each indicator element.

3. The apparatus of claim 1 wherein said control means includes means for providing end-of-message cue data representing the end of a recorded message, wherein the length of a recorded message is represented by the number of consecutive indicator elements that are energized in said first array; and wherein said control means includes further means responsive to said end-of-message cue data to extinguish an indicator element in said first array determined by said end-of-message cue data for indicating the end of one message and the beginning of the next message.

4. The apparatus of claim 3 wherein said device includes means for generating "priority" cue data for identifying which ones of the recorded messages are "priority" messages; and wherein said control means includes means responsive to "priority" cue data to energize consecutive indicator elements in said first array in a distinctive manner to represent the "priority" messages.

5. The apparatus of claim 4 wherein the means to energize causes the indicator elements representing a "priority" message to flash at a predetermined rate and causes the indicator elements representing a non-priority message to be energized to provide a steady-state visual indicator.

6. The apparatus of claim 1 wherein said control means includes means for providing instruction cue data representing a recorded instruction, the location of a recorded instruction is represented by the energization of a corresponding indicator element in said second array; and wherein said control means includes additional means responsive to said instruction cue data to energize respective indicator elements in said second array as determined by said instruction cue data.

7. The apparatus of claim 6 wherein said device includes means for generating "special instruction" cue data for identifying which ones of the recorded instructions are "special"; and wherein said control means includes means responsive to "special instruction" cue data to energize indicator elements in said second array in a distinctive manner to indicate the locations of "special instructions".

8. The apparatus of claim 7 wherein the means to energize causes the indicator elements indicating the locations of "special instructions" to flash at a predetermined rate and causes the indicator elements indicating the locations of non-special instructions to be energized to provide a steady-state visual indication.

9. The apparatus of claim 2 wherein said record medium comprises magnetic tape movable at different selectable dictation recording speeds; wherein each indicator element in each array represents a time-length of dictation; and further comprising means for selecting the time-length of dictation represented by an indicator element in accordance with the dictation recording speed at which said magnetic tape moves.

10. The apparatus of claim 2 wherein said record medium comprises a magnetic tape of a selectable length; wherein each indicator element in each array represents a time-length of dictation; and further comprising means for selecting the time-length of dictation represented by an indicator element in accordance with the selected length of said magnetic tape.

11. Display apparatus for a dictation device in which different types of messages and instructions are dictated onto a movable record medium, comprising:
cue data generating means for generating end-of-message cue data representing the end of a dictated message and for generating instructions cue data representing a dictated instruction:
a message indicator array comprised of multiple light segments selectively energized to provide a visual indication of the lengths of dictated messages;
an instruction indicator array comprised of multiple light segments selectively energized to provide a visual indication of the locations of dictated instructions;
a present-position indicator array comprised of multiple light segments selectively energized to provide a cursor indication of the present position of the record medium;
position generating means for generating position data representing the present positions of said record medium; and
processor means responsive to said position data and dictation for energizing a corresponding segment in said present-position indicator array and for energizing successive ones of the segments in said message indicator array as a message is dictated onto said record medium, said processor means being responsive to end-of-message cue data for blanking a segment in said message indicator array to indicate the end of one message and the beginning of a next-following message, and said processor means being responsive to instruction cue data for energizing a segment in said instruction indicator array is determined by said position data to indicate the location of a dictated instruction.

12. The apparatus of claim 11 further comprising farthest advance means supplied with said position data for providing farthest advance data representing the farthest advance position reached by the record medium during the dictation of a message; means for moving said record medium beyond said farthest advance position without dictating messages; and means for sensing the subsequent dictation of a message; and wherein said processor means is operable to sense the difference between said position data and said farthest advance data to energize those segments in said message indicator array between said farthest advance position and the beginning of said subsequent dictation.

13. The apparatus of claim 11 wherein said processor means includes means for sensing the dictation of an initial message on said record medium, means for storing the position data representing the position of said record medium at the start of said initial message (the Beginning of Dictation (BOD) position), and means for sensing when the present position data is less than said BOD position, said processor means being further operable to energize those segments in said message indicator array between said BOD position and the present position of said record medium.

14. The apparatus of claim 11 wherein said end-of-message cue data comprises letter cue data or "priority" cue data, and wherein said processor means is responsive to said letter cue data to energize at a steady-state all of the segments in said message indicator array representing the length of a message and said processor means is responsive to said "priority" cue data to flash the segments in said message indicator array representing the length of a message.

15. The apparatus of claim 11 wherein said instruction cue data comprises instruction cue data and "special" instruction cue data, and wherein said processor means is responsive to said instruction cue data to energize at a steady-state the segment in said instruction indicator array which represents the location of a dictated instruction and said processor means is responsive to said "special" instruction cue data to flash the segment in said instruction indicator array which represents the location of a dictated "special" instruction.

16. Display apparatus for a transcription device in which different types of messages and end-of-message cue data representing the types of those messages and the locations of the ends of those messages are played back from a movable record medium, and in which different types of instructions and instruction cue data representing the types and locations of those instructions also are played back from said record medium, said apparatus comprising:

playback means for playing back messages, instructions, beginning-of-dictation data, end-of-message cue data and instruction cue data from a previously dictated record medium;

a message indicator array comprised of multiple light segments selectively energized to provide a visual indication of the lengths of dictated messages;

an instruction indicator array comprised of multiple light segments selectively energized to provide a visual indication of the locations of dictated instructions;

a present-position indicator array comprised of multiple light segments selectively energized to provide a cursor indication of the present relative position of the record medium;

position generating means for generating position data representing the present relative position of said record medium; and     processor means responsive to the end-of-message cue data and beginning-of-dictation data played back from said record medium to determine the end of one message and the beginning of the next-following message and for energizing corresponding segments in said message indicator array to indicate the length of a message and for blanking a segment in that array to indicate the end of that message, said processor means being additionally responsive to instruction cue data played back from said record medium for energizing selected segments in said instruction indicator array indicate the locations of dictated instructions, and said processor means being responsive to said generated position data for energizing a corresponding segment in said present-position indicator array to indicate the present position of said record medium.

17. The apparatus of claim 16 wherein said end-of-message cue data comprises letter cue data or "priority" cue data, and wherein said processor means is responsive to said letter cue data to energize at a steady-state all of the segments in said message indicator array representing the length of a message and said processor means is responsive to said "priority" cue data to flash the segments in said message indicator array representing the length of a message.

18. The apparatus of claim 16 wherein said instruction cue data comprises instruction cue data and "special" instruction cue data, and wherein said processor means is responsive to said instruction cue data to energize at a steady-state the segment in said instruction indicator array which represents the location of a dictated instruction and said processor means is responsive to said "special" instruction cue data to flash the segment in said instruction indicator array which represents the location of a dictated "special" instruction.

19. A modular dictation/transcription system comprising:

a record/playback module for recording and playing back on a record medium messages of different types and lengths, sand record/playback module providing location signals representative of the location of a record medium and cue signals representative of the generation of cues; and     a physically independent display module selectively connectable by a user to said record/playback module to form an integral structure therewith and having a first array of selectively energizable indicator elements for providing visual indications of the lengths of recorded messages; a second array of selectively energizable indicator elements for providing visual indications of the positions on said record medium of recorded instructions; a third array of selectively energizable indicator elements for providing a visual indication of the present relative location of said record medium; and control means, responsive to the location signals, the cue signals, and dictation, for controlling said first, second and third arrays to provide their respective visual indications concurrently.

20. A method of displaying lengths, types and locations of respectively different types of messages recorded on a record medium in a dictate/transcribe device, comprising the steps of:

providing location signals representative of the location of a record medium;

providing cue data representing the type of each recorded message and its location on said record medium;

energizing consecutive light segments in a first array of segments to indicate the length of a message and blanking a light segment determined by said cue data to indicate the end of one message and the beginning of the next message;

energizing selected light segments in a second array of segments, as determined by said cur data, to indicate the locations on said record medium of recorded instructions;

energizing a selected one light segment in third array of segments to provide a cursor indication of the present location of said record medium; and     wherein the message length, instruction location and cursor indications are visually displayed concurrently.

21. The method of claim 20 wherein each segment in each array is representative of a pre-selected length of said record medium; and further comprising the step of selecting the length represented by each segment.

22. The method of claim 20 wherein said cue data includes first and second end-of-message cue data representing the locations of the ends of "priority" and non-priority messages, respectively; and wherein the step of energizing light segments in said first array comprises flashing those segments which indicate the length of a "priority" message and energizing at a steady-state those segments which indicate the length of a non-priority message.

23. The method of claim 20 wherein said cue data includes first and second instruction cue data representing the locations of "special" and non-special instructions, respectively; and wherein the step of energizing light segments in said second array comprises flashing those segments which indicate the locations of "special" instructions and energizing at a steady-state those segments which indicate the locations of non-special instructions.

24. The method of claim 20 further comprising the steps of providing Beginning of Dictation (BOD) data representing the position on said record medium at which the first message starts; and energizing as the first segment in said first array the particular segment determined by said BOD data.

25. The method of claim 24 wherein each array is comprised of a predetermined number of segments, and wherein said cue data and said BOD data include counts which identify selected segments for energization or blanking in the respective arrays.

* * * * *